US005158419A

United States Patent [19]

Kempf et al.

[11] Patent Number: 5,158,419

[45] Date of Patent: Oct. 27, 1992

[54] WHEELCHAIR LIFT FOR TRANSIT VEHICLES HAVING ELEVATED PASSENGER COMPARTMENT FLOOR

[75] Inventors: Dale Kempf; Lawrence S. Aoki, both of Modesto, Calif.

[73] Assignee: Hogan Mfg., Inc., Escalon, Calif.

[21] Appl. No.: 658,797

[22] Filed: Feb. 21, 1991

Related U.S. Application Data

[63] Continuation-in-part of Ser. No. 528,744, May 24, 1990, Pat. No. 5,110,252.

[51] Int. Cl.[5] .......... B60P 1/44

[52] U.S. Cl. .......... 414/539; 414/549; 414/921

[58] Field of Search .......... 414/540, 541, 545, 546, 414/549, 556, 917, 921, 539

[56] References Cited

U.S. PATENT DOCUMENTS

| | | | |
|---|---|---|---|
| 3,847,292 | 11/1974 | Williams et al. | 414/921 X |
| 4,113,121 | 9/1978 | Collins et al. | 414/545 |
| 4,134,504 | 1/1979 | Salas et al. | 414/921 X |
| 4,273,217 | 6/1981 | Kajita | 414/921 X |
| 4,474,527 | 10/1984 | Risner et al. | 414/540 |
| 4,479,753 | 10/1984 | Thorley | 414/541 |
| 4,566,128 | 12/1985 | Thorley et al. | 414/540 X |
| 4,579,503 | 4/1986 | Disque | 414/546 X |
| 4,664,584 | 5/1987 | Braun et al. | 414/541 |
| 4,808,056 | 2/1989 | Oshima | 414/921 X |
| 4,958,979 | 9/1990 | Svensson | 414/921 X |

OTHER PUBLICATIONS

Photographs of Synergetics Lift, submitted by applicant.

*Primary Examiner*—David A. Bucci
*Attorney, Agent, or Firm*—Christensen, O'Connor, Johnson & Kindness

[57] ABSTRACT

A wheelchair lift for a vehicle, such as a tour bus, having an elevated seating area and a compartment beneath the seating area. The lift includes a carriage (38) movable into and out of the compartment, a platform (56, 58) on the carriage, and a powered linkage (66, 76, 78) for raising and lowering the platform. The lift also includes stow latch mechanism (200) for securing the platform in the stowed position, and a door interlock system (300) for preventing the vehicle door above the lift from being opened except when the lift is positioned at or near the floor of the vehicle.

10 Claims, 11 Drawing Sheets

WHEELCHAIR LIFT FOR TRANSIT VEHICLES HAVING ELEVATED PASSENGER COMPARTMENT FLOOR

This is a continuation-in-part of U.S. patent application Ser. No. 07/528,744, filed on May 24, 1990, now U.S. Pat. No. 5,110,252.

TECHNICAL FIELD

This invention relates generally to wheelchair lifts to be used on vehicles. More specifically, it relates to such lifts for use on tour or highway buses or other vehicles, such as railway cars, having a passenger compartment that is sufficiently above the ground to make impractical the use of a conventional stairwell-located wheelchair lift.

BACKGROUND OF THE INVENTION

In recent years there has been a recognized and, therefore, growing need to accommodate the needs of those in wheelchairs on public transportation. To this end, there has been a large number of devices proposed to provide wheelchair lifts in transit buses—those intended for use on city and suburban streets. Such buses have two features that have shaped the design and location of such lifts on the bus. One is that they are typically not far off the ground or pavement and the other is that they usually have more than one door. Therefore, it has been possible to design wheelchair lifts to be mounted inside one of the doors leaving at least one other door unencumbered. Likewise, because the distances between pavement or curb level and the bus floor level are not excessive, the actuating or raising and lowering means can be mounted adjacent a doorway stairwell and still leave room for the steps and floor space in the vicinity of the steps.

Tour or intercity buses, however, have totally different problems. They are, first of all, much taller than transit buses. In a typical tour bus, the floor of the bus may be 54 inches above the pavement, while the underside of the bus may be 13 inches above the pavement. Similarly, the floor of a railway car may oftentimes be many feet above the floor of an adjacent platform. These distances require a lifting mechanism that cannot easily be contained within the spaces available around the stairwell of such a bus or railway car.

Although the lift disclosed in U.S. Pat. No. 07/528,744 (the "'744 application") functions highly effectively and is a significant improvement over prior lift designs, it has been determined that under certain conditions the carriage assembly which supports the lift platform has a tendency to inadvertently move in the direction of deployment along the support rails on which the carriage is slidably mounted. More specifically, when in the stowed position, the platform assembly may move outwardly toward the door closing off the compartment in which the lift is housed. Such movement, which typically occurs as a result of hydraulic seepage of the hydraulic actuators which cause the carriage to move back and forth along the support rails, may result in damage to the associated compartment door, or to the lift itself.

To avoid this problem, wheelchair lifts similar to the lift of the present invention have used a mechanical latch assembly for securing the lift platform in the stowed position. One such mechanical latch assembly includes a hydraulic cylinder provided solely for the purpose of causing the latch to move from a locked to an unlocked position. Because the addition of such a hydraulic cylinder, and its associated hoses and controls, adds to the cost and complexity of the lift, a need exists for an effective mechanical stow latch which does not include a hydraulic cylinder provided solely for the purpose of actuating the latch.

With lifts of the type disclosed in the '744 application, during certain operational phases of the lift the possibility exists that someone could fall out of the door opening positioned above the lift onto the ground or onto the lift itself. Thus, a need exists for a system which reduces or avoids the possibility of such a fall.

SUMMARY OF THE INVENTION

The present invention is designed to enhance the performance and safety of wheelchair lifts of the type disclosed in the '744 application. To this end, the present invention includes a mechanical stow latch mechanism for securing the lift platform on the stowed position. The stow latch mechanism is made up of purely mechanical components, and so avoids the need for a separate hydraulic cylinder to lock and unlock the latch mechanism. Furthermore, the present invention includes an interlock system for preventing the vehicle door associated with the lift from opening, except when the platform is positioned at or close to the floor level of the vehicle.

BRIEF DESCRIPTION OF THE DRAWINGS

The invention itself is set forth in the claims appended hereto and forming a part of this specification, while an understanding of an embodiment may be had by reference to the detailed description taken in conjunction with the drawings in which:

DETAILED DESCRIPTION OF THE PREFERRED EMBODIMENT

Figure 1:
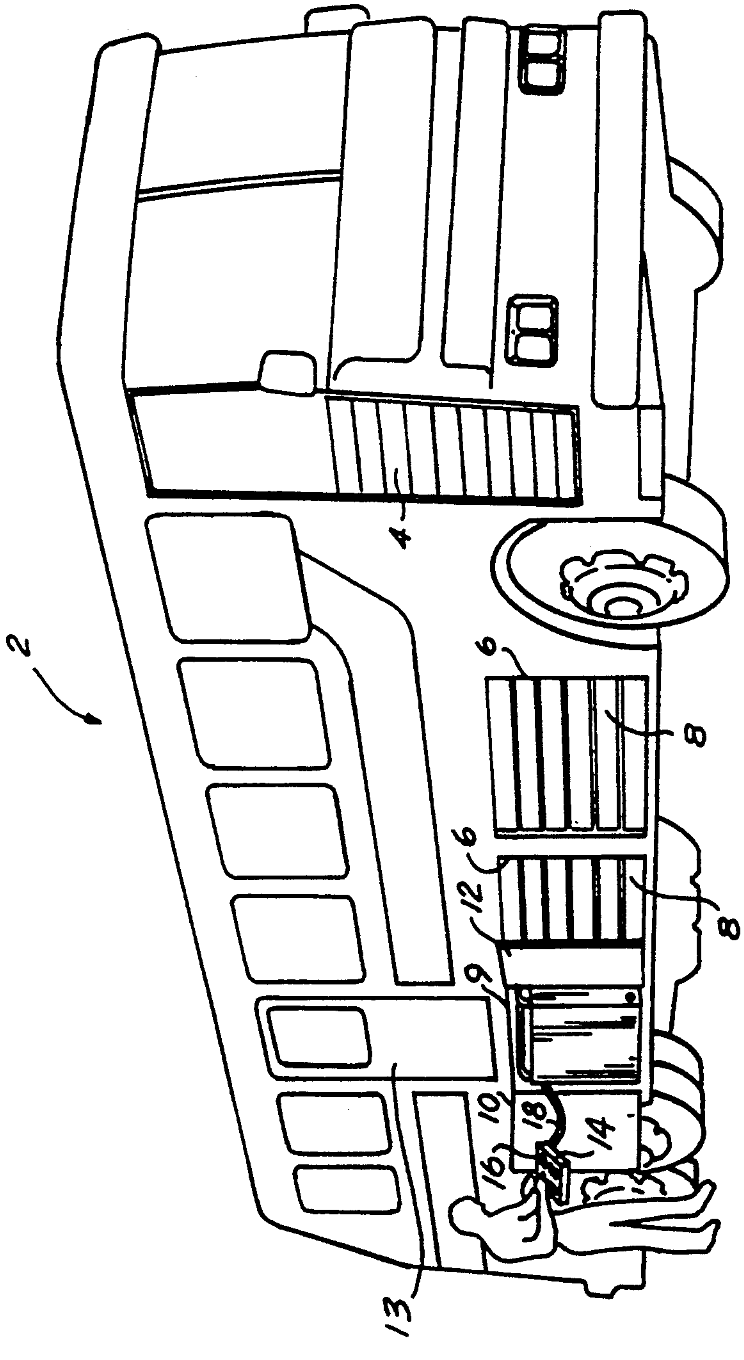
FIG. 1 is a perspective view of a tour bus illustrating how a wheelchair lift, in accordance with the invention, may be installed thereon.
Figure 2:
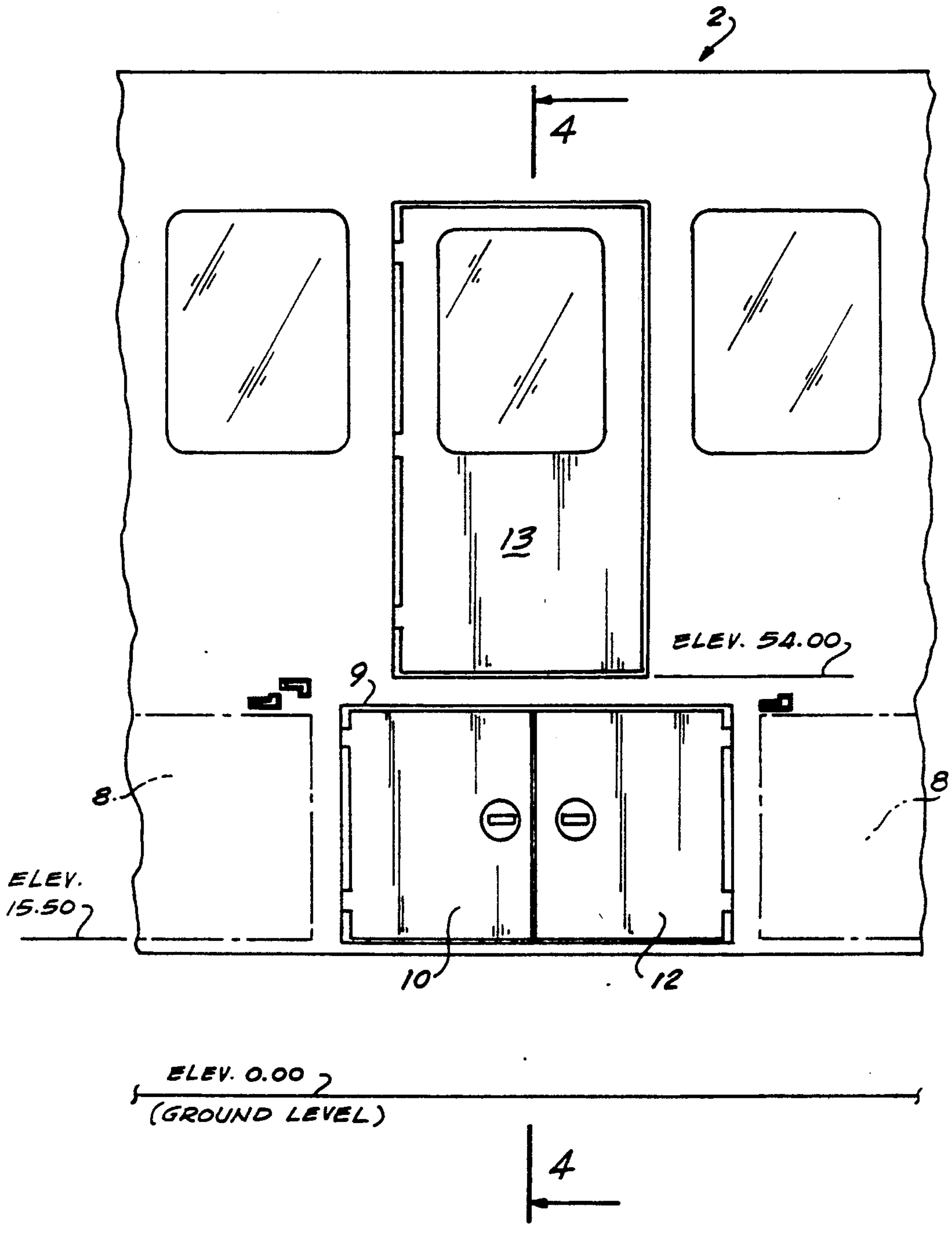
FIG. 2 is a partial side view of a vehicle having an access door and a lift-stowing compartment under that door.

The present invention is a wheelchair lift intended for use on a bus 2 of the tour or intercity type, one embodiment of which lift is illustrated in FIG. 1. Bus 2 is provided with usual windows and a door 4. As is well known, the floor of an intercity bus is higher off the ground than the floor of a typical transit bus. For instance, the floor of one type of intercity bus is about 54 inches above the ground while its underside is about 13 inches above the ground. Such dimensions are provided so that the bus can be provided with a series of baggage compartments 6 spaced along its length. Doors 8 close off compartments 6 and are designed to open upwardly so as to permit baggage and other articles to be loaded or unloaded from the compartments.

In accordance with this invention, one baggage compartment 9 is dedicated to the stowing of the lift of the present invention and the apparatus for raising and lowering it. This compartment may be opened and closed using vertically hinged doors 10 and 12 which are designed to be swung out of the way when the lift is in operation. An access door 13 positioned above compartment 9 is provided to permit a wheelchair user to enter and exit from the lift.

In a tour bus the operator's seat is at the front of the bus and, because of the distance between the driver and the lift and his lack of a line of sight to the lift, it is desirable that, when the lift is in operation, he or someone else have a direct view of its operation. Therefore, this invention provides a control panel 14 normally stored within the compartment 9. During operation of the lift the control panel is removed from a storage rack (not shown) and its control buttons 16 are actuated to control the operating sequence described hereinafter. Control panel 14 is connected by a cable 18 to the lift.

Figure 3:
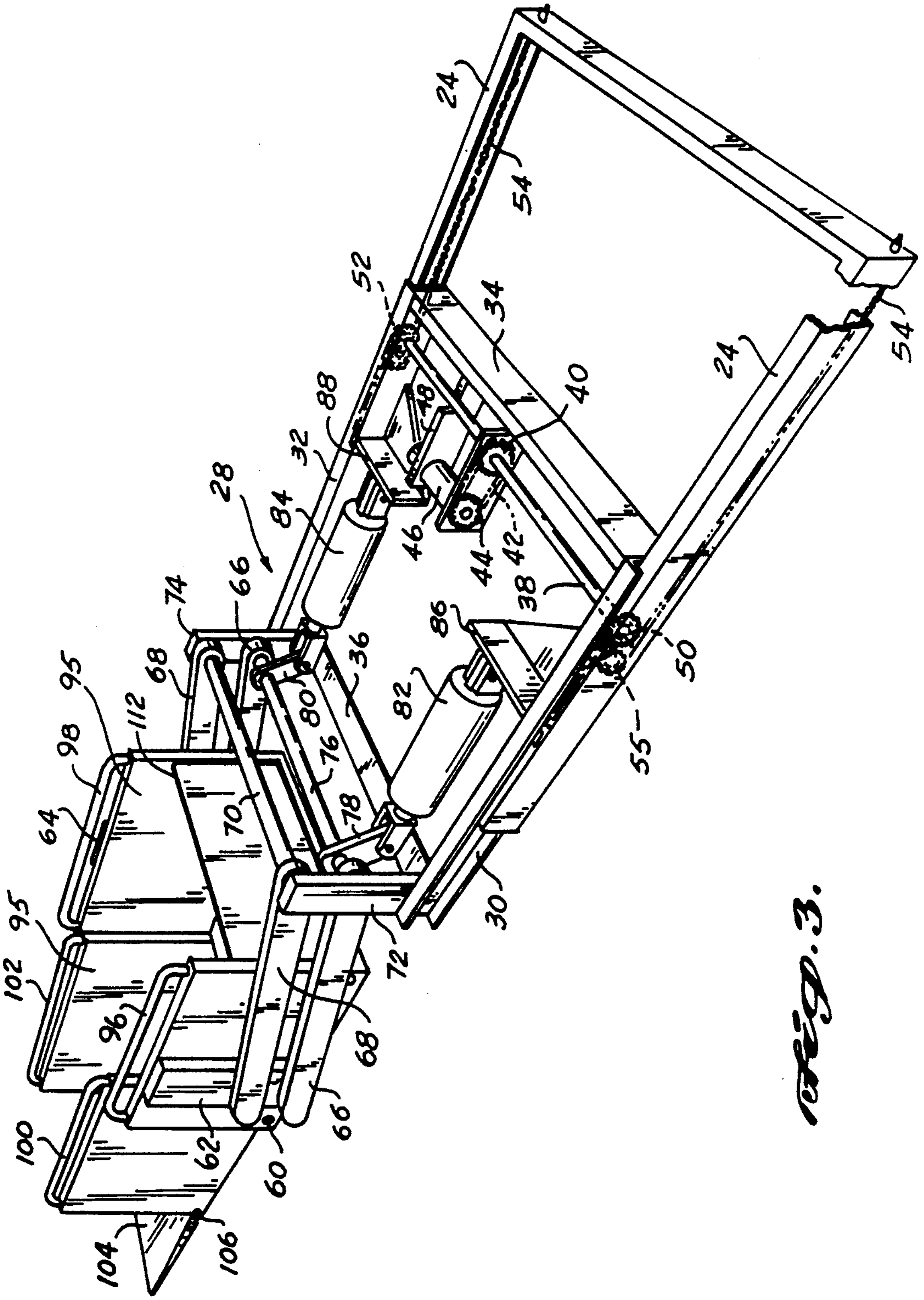
FIG. 3 is an isometric illustration of an embodiment of a lift in accordance with the invention.
Figure 4:
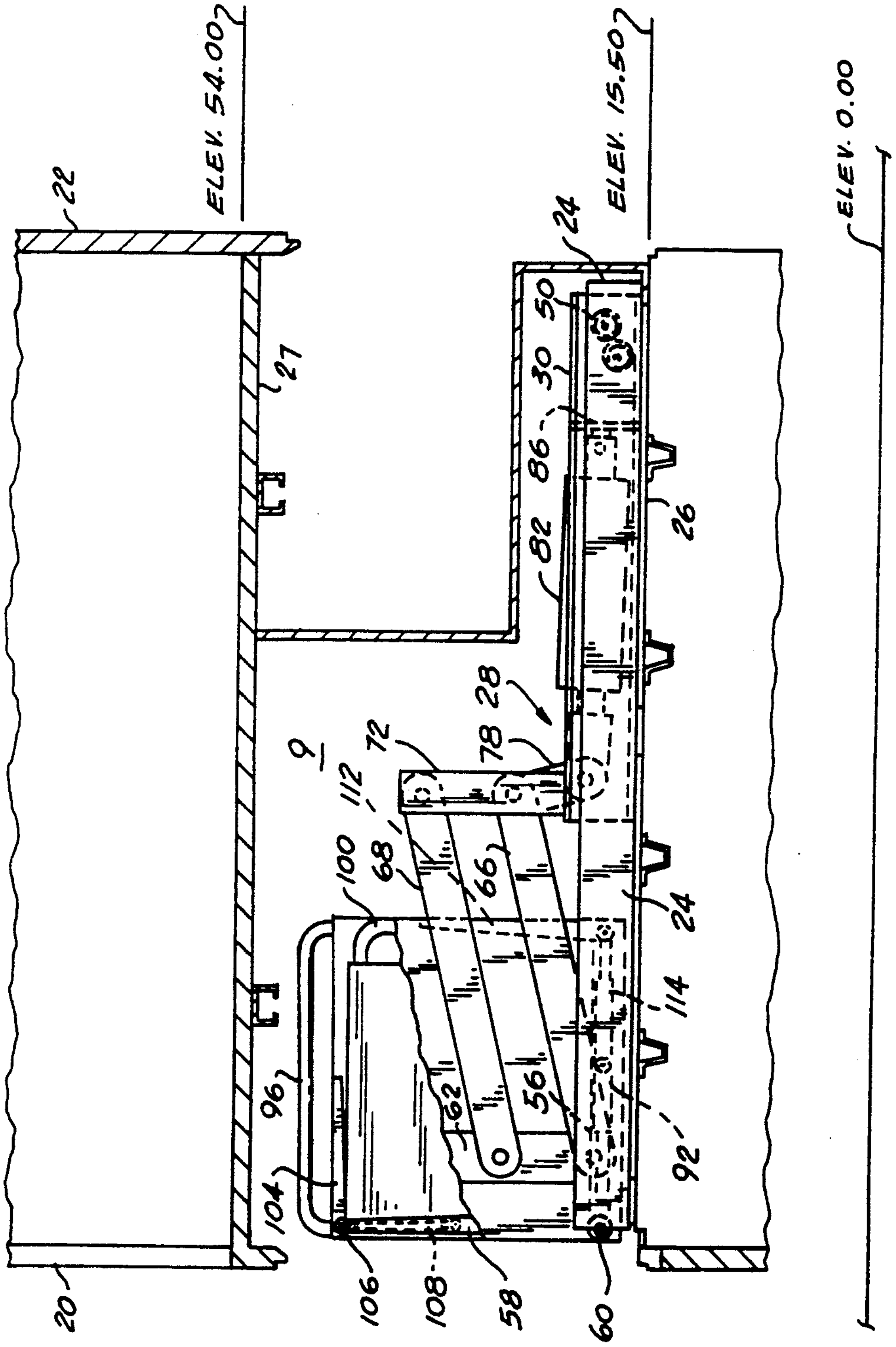
FIG. 4 is a side view of an embodiment of the invention in the stowed position on a bus.

A preferred embodiment of the invention is illustrated in FIGS. 3 and 4. A pair of spaced guide and support rails 24 are secured by a suitable means, such as bolts or clamps, to the bottom floor 26 or other structure of compartment 9. Alternatively, support rails may be supported from passenger floor 27 (FIG. 4), or from both (a) the passenger floor and/or portions of the stowage compartment 9 and (b) passenger floor 27. Mounted between the guide rails 24 is a carriage 28 consisting of a pair of spaced channel members 30 and 32 and a pair of transverse channel members 34 and 36 which are attached to the front and rear ends of the spaced channels so as to provide a rigid rectangular structure.

FIG. 4 illustrates the lift positioned in the stowage compartment 9 of a tour bus. The compartment 9 extends from one side 20 to the other side 22 of the bus, and includes a bottom floor 26 which is spaced from a passenger floor 27 a sufficient distance to accommodate the lift. At the rear of the carriage an axle 38 (FIG. 3) extends transversely of the carriage and is rotatably mounted in the channel members 30 and 32. Mounted on the axle is a driven sprocket 40 to which a drive chain 42 is connected. A driving sprocket 44 is driven by a motor 46 mounted on a suitable support 48 secured to the member 34. Propulsion of the carriage, inwardly and outwardly of the compartment 9, is provided by sprockets 50 and 52 secured on opposite ends of the axle 38. The sprockets engage between the links of chains 54 secured at one end to the guide rails 24. The chains are then passed around idler sprockets 55 mounted on the channel rails 30 and 32, around the sprockets 50, 52, and then are secured to guide rails 24. Upon actuation of the motor 46, the axle 38 will cause the sprockets 50 and 52 to rotate to move the carriage inwardly or outwardly along guide rails 24, depending upon the direction of rotation of the motor.

Figure 5:
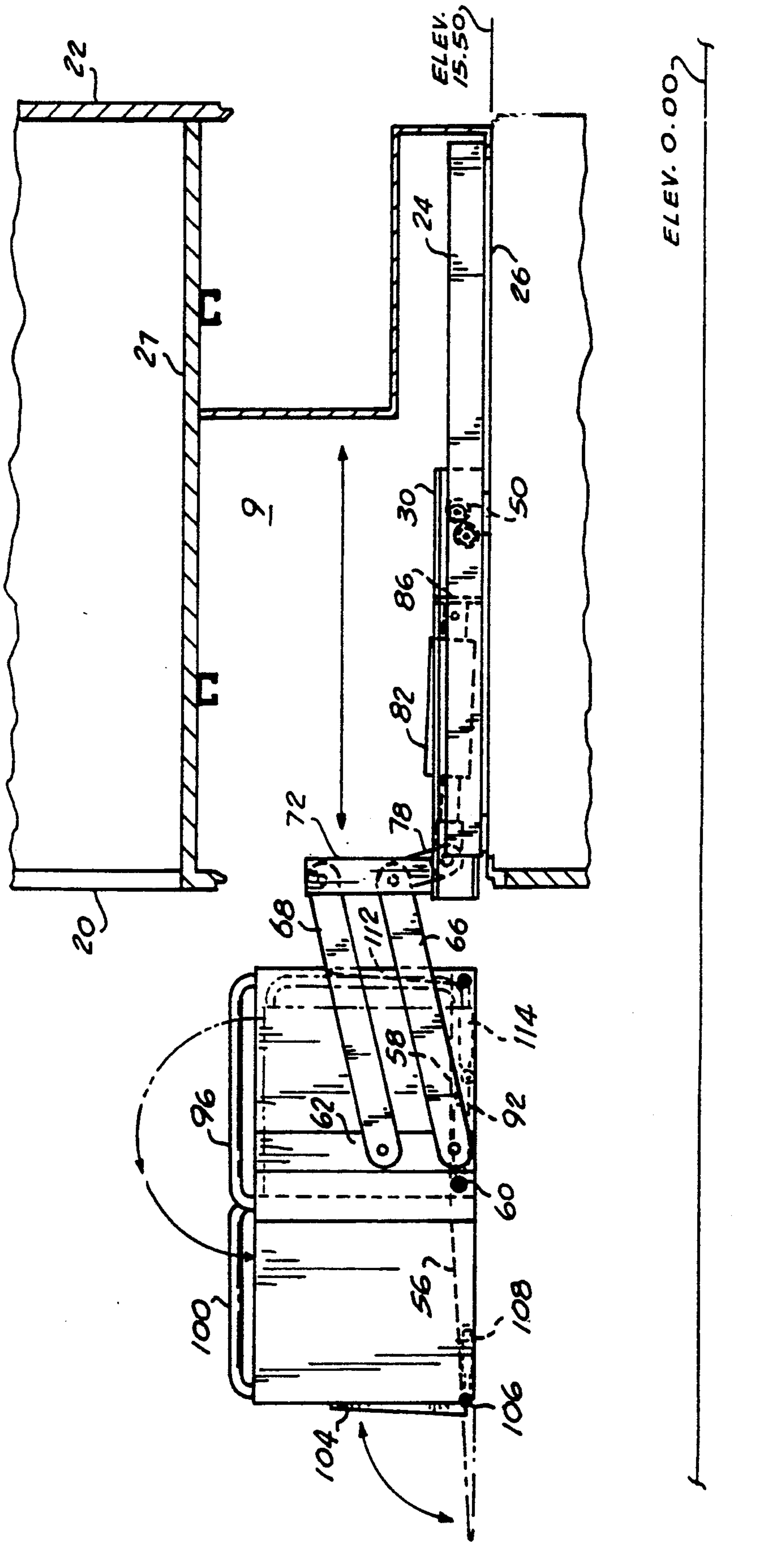
FIG. 5 is a side view of the embodiment of FIG. 3 in the deployed position.
Figure 6:
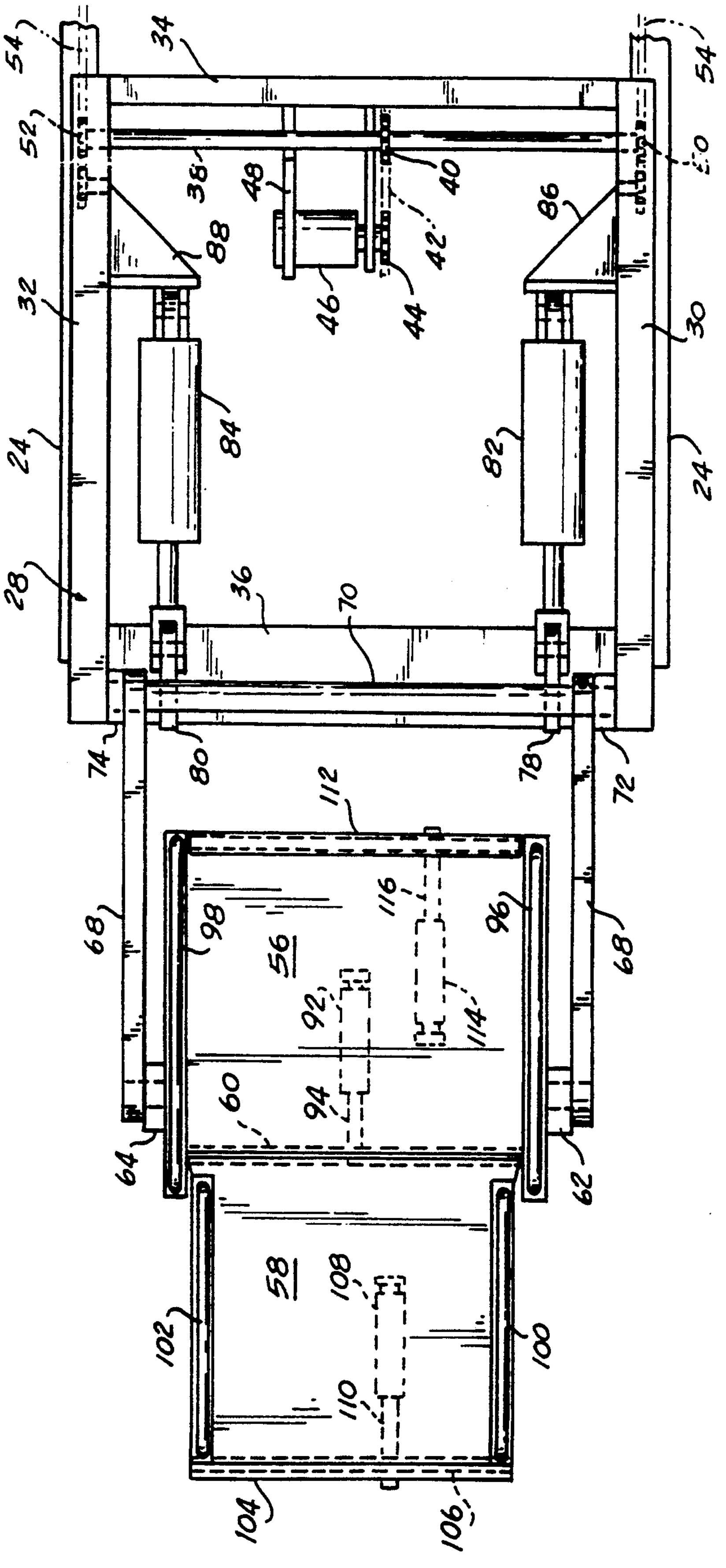
FIG. 6 is a plan view, partially in section, showing the embodiment of FIG. 2 in the deployed position.
Figure 7:
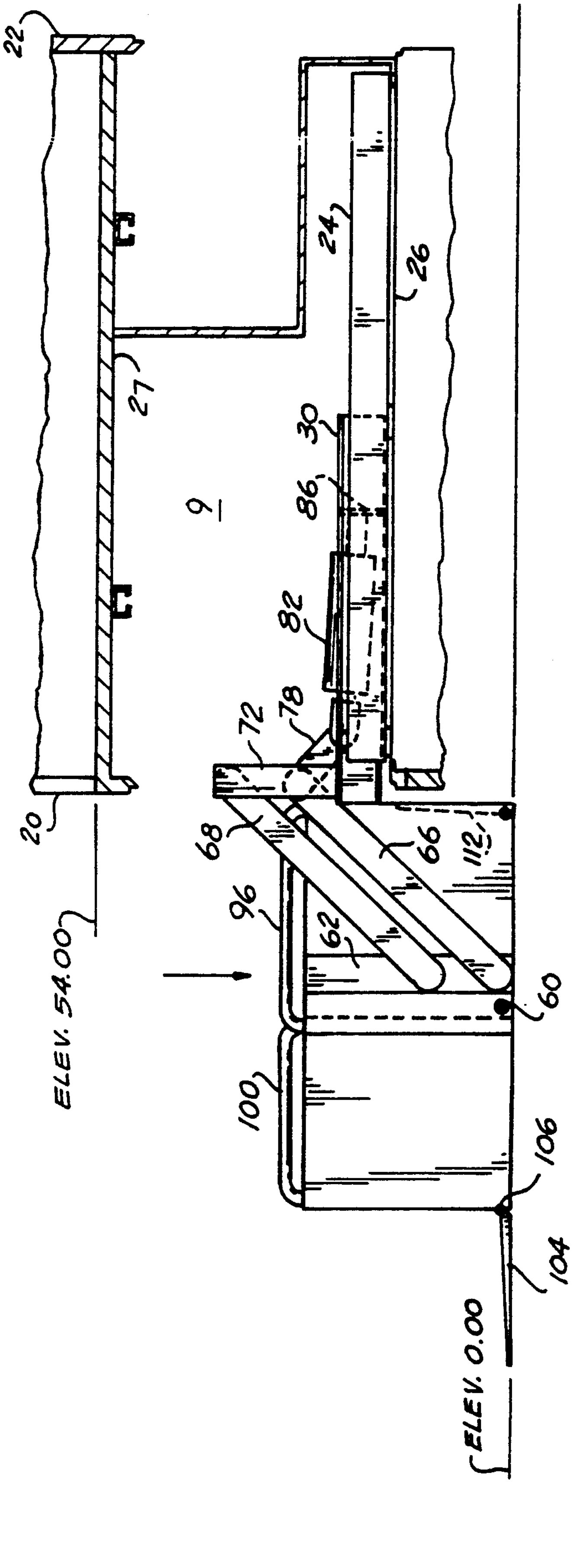
FIG. 7 is a side view showing the embodiment of FIG. 3 at ground level.
Figure 8:
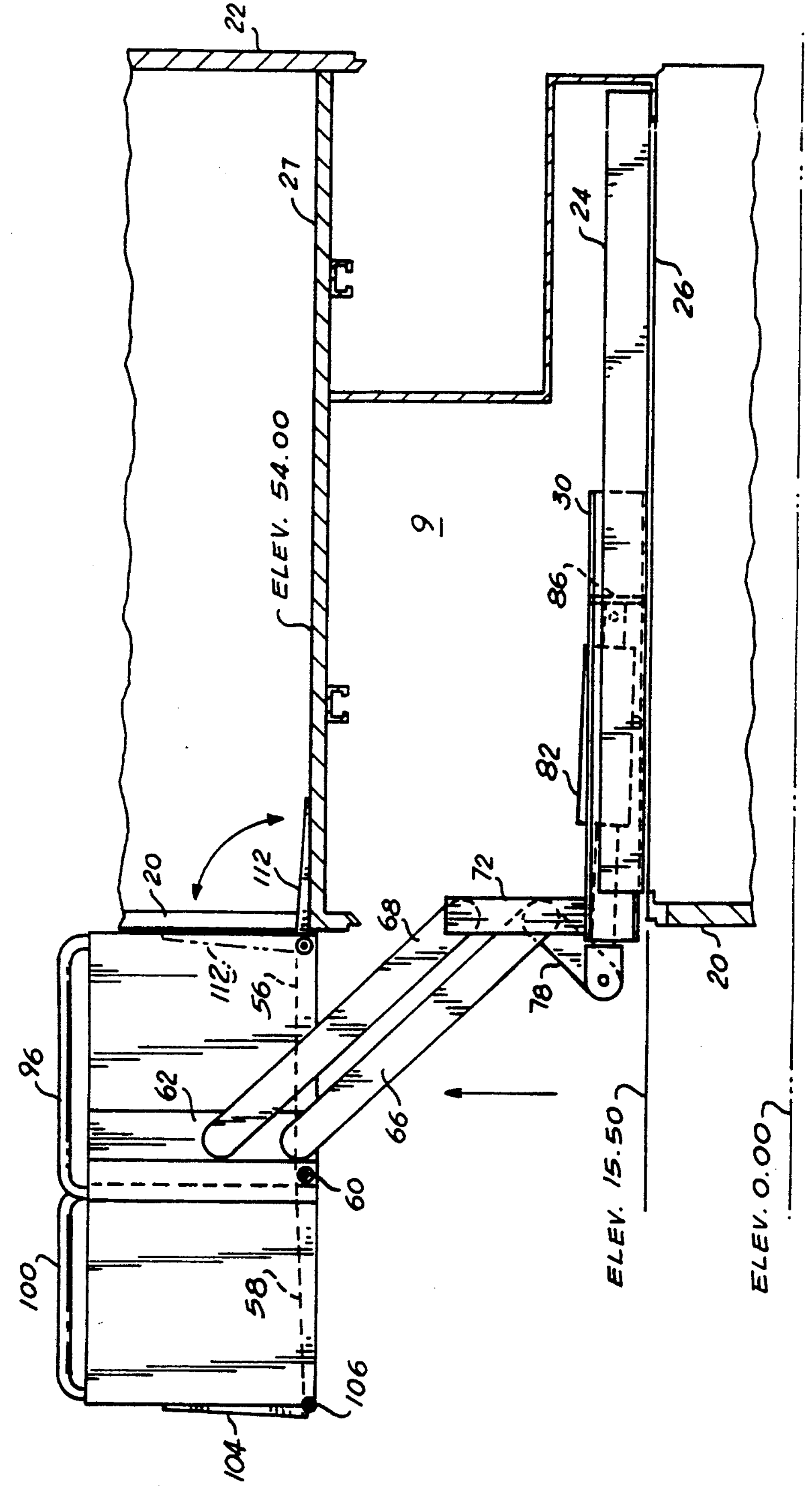
FIG. 8 is a side view showing the embodiment of FIG. 3 at the level of the bus floor.

Referring to FIGS. 3-5, the present invention includes a lift platform consisting of a fixed platform 56 and an articulating platform 58, both of which are mounted on the carriage 28. The articulating platform is pivotally mounted via hinge 60 to the fixed platform. The latter is secured to a pair of vertically extending forward arms 62 and 64. The forward arms 62 and 64 are secured by welding or any other suitable means to the fixed platform 56.

Pivotally connected to the forward arms 62 and 64 are a pair of lifting links 66, while a pair of stabilizing links 68 are pivotally connected to those arms above the lifting links. The stabilizing links 68 at their distal ends are secured to a tube 70 rotatably mounted on a pin which is mounted on a pair of rearward vertically extending arms 72 and 74 secured to the carriage 28. Arms 72 and 74 function to maintain the platform in a horizontal position at all times during stowage and operation. The lifting links 66 at their distal ends are secured to a tube 76, rotatably mounted on a pin fixedly mounted on the rearward arms 72 and 74. As discussed below, tube 76 actually provides the lifting and lowering force for the platform.

This lifting force derives from a pair of crank arms 78 and 80 secured to the tube 76. The crank arms are rotated by hydraulic actuators 82 and 84, having their cylinders pivotally mounted on brackets 86 and 88, respectively, which are attached to the channels 30 and 32. Thus, as the pistons in the actuators 82 and 84 are extended, the crank arms 78 and 80 will rotate in the clockwise direction as shown in FIGS. 4 and 5. This clockwise rotation of the crank arms will cause shaft 76 to rotate and, in turn, the lifting links 66 to raise the platform to bus floor 27. As the pistons of the actuators are retracted, the crank arms 78 and 80 will rotate counterclockwise to lower the platform first to the level of the floor 26 and then to ground level.

The platform, as stated, consists of two parts, a fixed part 56 and a movable part 58. As may be seen in FIG. 4, the movable part 58 in the stowed position extends upwardly at about 90° to the plane of the fixed platform. The lift includes a hydraulic actuator 92, having its piston rod 94 connected to a lever (not shown) on the underside of the platform 58 and the end of its cylinder connected to the underside of the platform 56. When the hydraulic actuator 92 is actuated to retract the piston 94, the platform 58 is caused to rotate about 90° in a counterclockwise direction so as to extend in approximately the same plane as the fixed platform 56, whereby a longer substantially horizontal platform is created sufficient in length and width to accommodate a wheelchair.

To provide protection and a sense of security for a person in a wheelchair while on the lift, a number of features are provided.

The first of these are protective side panels 95 on opposite sides of the platform to protect passengers from pinch points as links pass by the platform. Another safety feature is protective railings on opposite sides of the platform. A pair of such railings 96 and 98 extend upwardly on opposite sides of the fixed platform 56, both in the stowed and deployed positions. Another pair, 100 and 102, of such railings extend substantially horizontally on the movable platform 58 when the lift is in the stowed position (see FIG. 4) but when that platform is rotated about 90° to the deployed position, they extend upwardly (see FIG. 5).

Another safety feature is the provision of a curbside barrier 104. This barrier extends substantially horizontally over the fixed platform when the lift is in the stowed position (see FIG. 4) but extends upwardly from the movable platform 58 when the lift is in the initial stow deploy position (see FIG. 3). A hinge 106 pivotally connects the barrier 104 to the movable platform 58 and has connected thereto a lever arm. A hydraulic actuator 108 has its piston 110 connected to the lever arm so that, when the piston retracts, the barrier 104 will rotate counterclockwise to engage the ground or curb to provide a ramp, permitting a wheelchair to be rolled onto the platform created by platforms 56 and 58.

Another safety feature is a rear barrier 112 pivotally mounted on the fixed platform 56. It is rotated by a hydraulic actuator 114 having a piston 116 connected to a lever arm on its underside. In the stowed and deployed positions, the barrier extends upwardly from the fixed platform 56 and remains so until the platform reaches the level of the bus floor 27. At that point the piston 116 retracts, pivoting the barrier 112 clockwise so that it forms a bridge between the platform and bus floor 27, permitting easy movement of the wheelchair from the platform into or out of the interior of the bus.

As described thus far, the wheelchair lift of the present invention is identical to the wheelchair lift disclosed in the '744 application. For a description of the operation of the above-described components of the present lift, attention is directed to the '744 application. As discussed hereinafter, the lift of the present invention also includes several enhancements of the lift of the '744 application.

Figure 9:
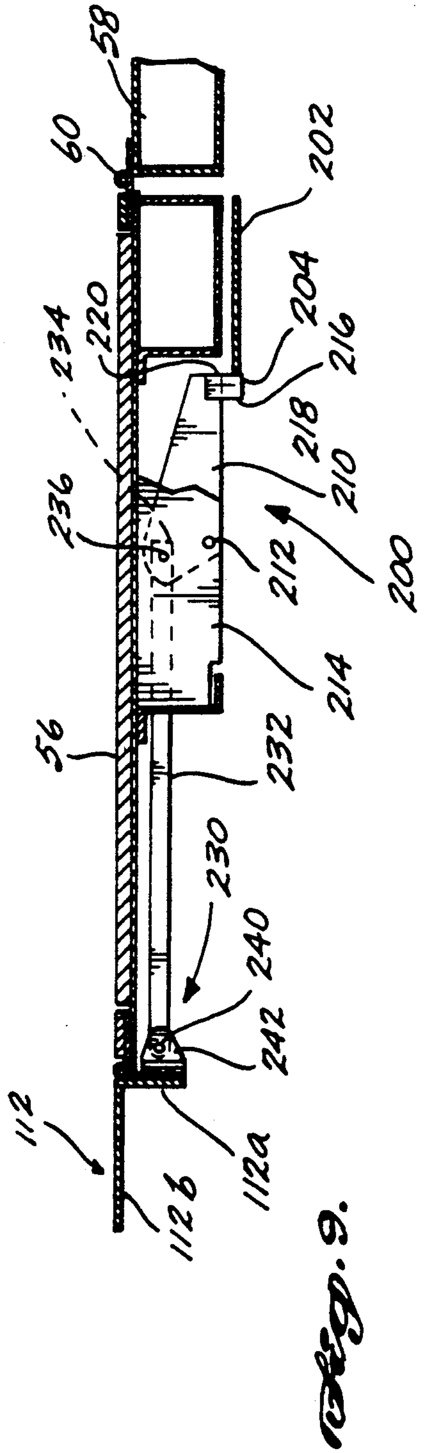
FIG. 9 is a side elevational view of the main platform and the stow latch mechanism, with the latter being illustrated in the locked position.
Figure 10:
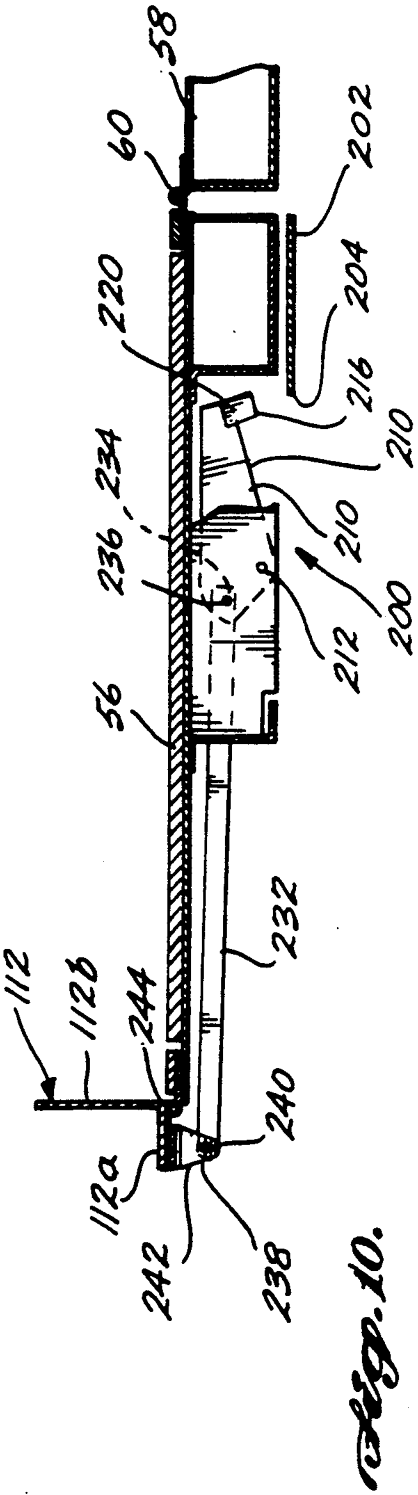
FIG. 10 is similar to FIG. 9, except that the stow latch mechanism is illustrated in the unlocked position.

Referring now to FIGS. 4, 9, and 10, the lift of the present invention also preferably comprises the stow latch assembly 200 for mechanically locking and retaining the fixed and articulating platforms 56 and 58 in the stowed position illustrated in FIGS. 4 and 9. Stow latch assembly 200 comprises a barrier plate 202 having a contact edge 204. Barrier plate 202 is attached to fixed portions of the present lift or to the walls or other structural components of the compartment 9 of the vehicle in which the present lift is housed in fixed relation to platforms 56 and 58. More specifically, barrier plate 202 is mounted so as to lie directly beneath the outer end (i.e., the right end as illustrated in FIGS. 9 and 10) of fixed platform 56 when the latter is in the stowed position illustrated in FIGS. 4 and 9. By this placement of barrier plate 202, fixed and articulating platforms 56 and 58 are free to move from the stowed to the deployed positions relative to the barrier plate without engaging the latter during such movement. The specific design of barrier plate 202 is not important; however, the plate should be of sufficient rigidity to withstand the forces which are applied to the plate by the lift platform, as discussed below.

Stow latch assembly 200 further comprises a pivot plate 210 which is pivotally mounted via pin 212 to a support plate 214 attached to the bottom surface of fixed platform 56. Pivot plate 210 comprises a finger portion 216 attached to the outer end (i.e., the right end as illustrated in FIGS. 9 and 10) of the pivot plate so as to project downwardly below the bottom edge 218 of the pivot plate. Finger portion 216 includes a front edge 220.

Pivot plate 210 is pivotally mounted to plate 214 and is sized and configured so as to be movable between a locked position illustrated in FIG. 9 and an unlocked position illustrated in FIG. 10. In the locked position, the front edge 220 of finger portion 216 engages and confronts contact edge 204 of barrier plate 202. In the unlocked position, the entire length of finger portion 216 is positioned above barrier plate 202 so that no portion of pivot plate 210 will contact the barrier plate as fixed platform 56 moves back and forth along support rails 24 between the stowed and deployed positions.

Stow latch assembly 200 further comprises a linkage assembly 230 for coupling pivot plate 210 with bridge barrier 112. Linkage assembly 230 includes an elongate connecting shaft 232 having an outer end 234 which is pivotally mounted via pin 236 to the inboard end (i.e., the left end as illustrated in FIGS. 9 and 10) of pivot plate 210. The inner end 238 of connecting shaft 232 is pivotally attached via pin 240 to bracket 242. The latter is attached to the short leg **112*a* of bridge barrier 112 so that the connecting shaft 232 will move back and forth along its longitudinal axis as bridge barrier 112 moves between the extended position illustrated in FIG. 9 and the retracted position illustrated in FIG. 10. As illustrated in the FIGS. bridge barrier 112 comprises a short portion 112*a* and a long portion 112*b*. Portions 112*a* and 112*b* are sized and attached together so that the bridge barrier has an L-shaped cross-sectional configuration as viewed in FIGS. 9 and 10. The pivot axes of pivot pins 212, 236, and 240 extend parallel to the pivot axis of hinge 244 which couples bridge barrier 112 with fixed platform 56. As a consequence of this orientation of the pivot axes of pins 212, 236, and 240 relative to the pivot axis of hinge 244, together with the sizing and configuration of the various components of stow latch assembly 200, movement of bridge barrier 112 between the extended position illustrated in FIG. 9 and the retracted position illustrated in FIG. 10 will cause pivot plate 210 to move, respectively, between the locked position illustrated in FIG. 9 and the unlocked position illustrated in FIG. 10. As discussed above, bridge barrier 112 is caused to move between the extended and retracted positions by hydraulic actuator 114. Thus, in addition to causing bridge barrier 112 to move between the extended and retracted positions, hydraulic actuator 114 also causes pivot plate 110** to move between the locked and unlocked positions.

The design of stow latch assembly 200 is selected so that when latch 210 is in the locked position, front edge 220 of pivot plate 210 confronts and is blocked by barrier plate 202 such that the pivot plate is prevented from moving past barrier plate 202 toward the deployed position, i.e., to the right as illustrated in FIGS. 9 and 10. This blockage of pivot plate 210 also prevents fixed platform 56 from moving toward the deployed position due to the mechanical interconnection of the pivot plate and fixed platform. Conversely, when pivot plate 210 is in the unlocked position, fixed platform 56 is free to move between the stowed and deployed positions.

Stow latch assembly 200 possesses an important advantage over conventional mechanical latches designed to secure wheelchair lifts in a retracted position. Specifically, known mechanical latch assemblies for securing wheelchair lifts in a stowed position typically comprise a dedicated hydraulic actuator for causing the stow latch mechanism to move between the locked and unlocked positions. The presence of such a dedicated hydraulic actuator both adds to the overall cost of the platform lift, as well as increases the complexity of construction and operation of the wheelchair lift. Thus, by coupling the stow latch assembly of the present invention with the hyrdaulic actuator which already exists for performing other actuation functions, the cost and complexity of the present lift is reduced.

With platform lifts of the type disclosed in the '744 application, the possibility exists when the lift is in the stowed position or when the lift is being moved upwardly toward the floor level of the vehicle that someone could open the vehicle door positioned above the platform lift and fall out of the door opening. Inasmuch as the floor level of vehicles of the type in which the lift of the present invention is used is typically positioned about four to five feet above the surface on which the vehicle operates, serious or even fatal injuries could occur if a person were to fall out of the door opening of the vehicle.

Figure 11:
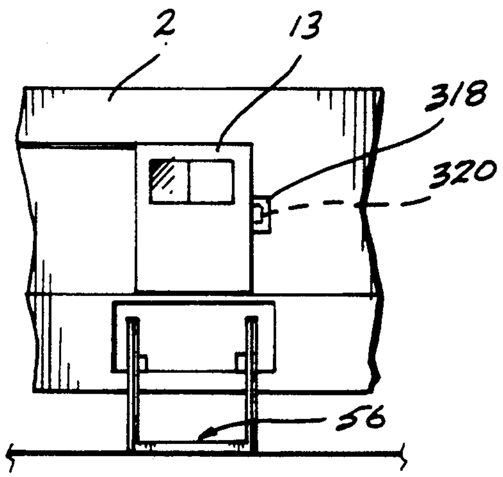
FIG. 11 is a schematic side elevational view of a portion of the vehicle in which the lift is located, with the main platform of the lift being positioned on the ground and the door associated with the lift being closed.
Figure 12:
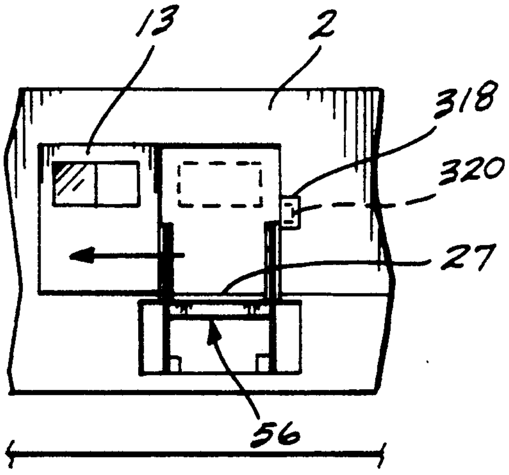
FIG. 12 is similar to FIG. 11, except that the lift is positioned about six inches below the floor of the vehicle and the door is open.
Figure 13:
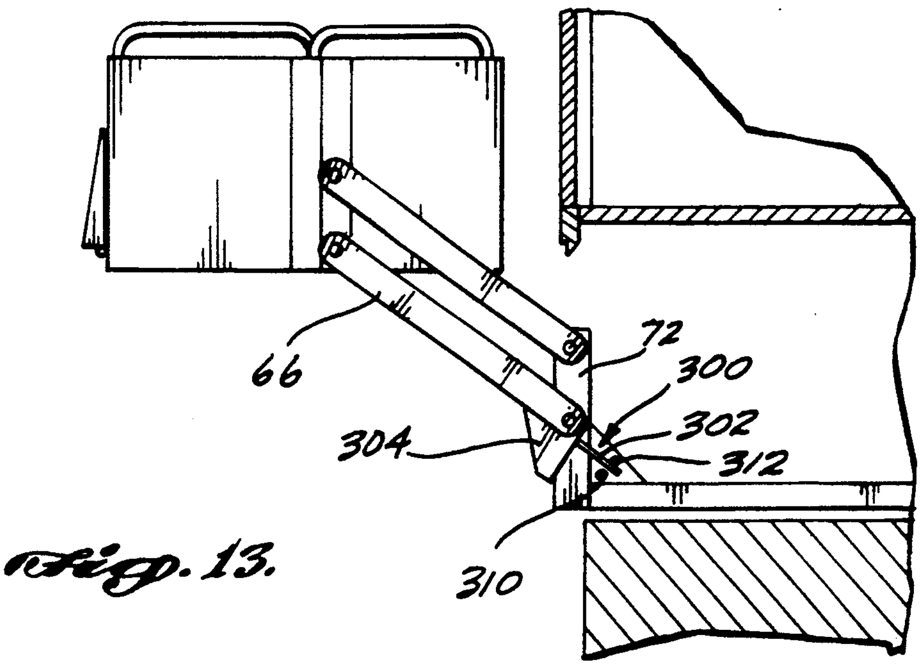
FIG. 13 is similar to FIG. 5, except that the sensor assembly of the door interlock system is illustrated and the lift platform is positioned about six inches below the floor level of the vehicle.
Figure 14:
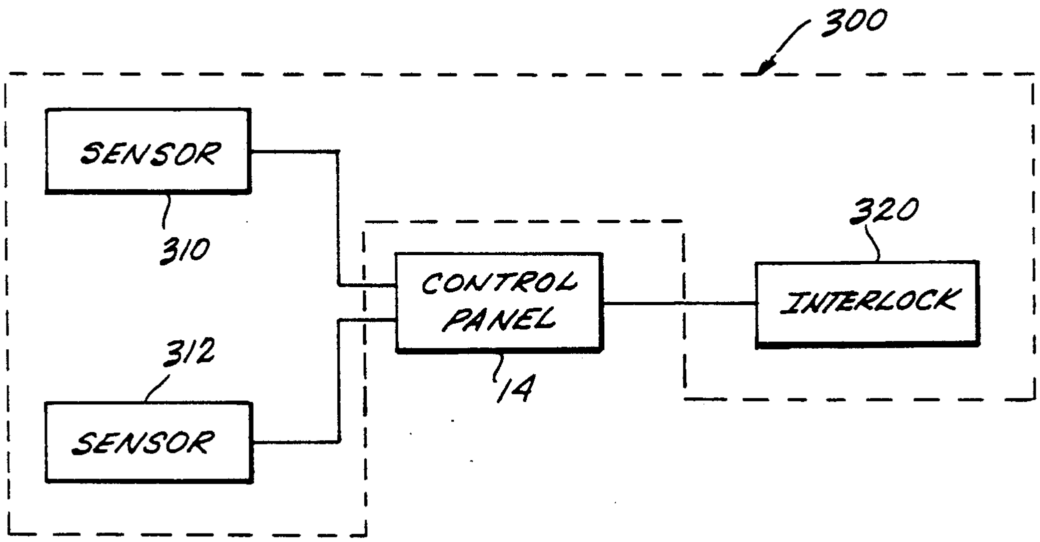
FIG. 14 is a schematic block diagram of the door interlock system.

Referring to FIGS. 11-14, to minimize the possibility of such an accident, the lift of the present invention preferably comprises a door interlock system for preventing door 13 from being opened except when fixed platform 56 is positioned at or adjacent the floor level of floor 27 of the vehicle. When it is desired to use the present door interlock system, door 13 should be mounted to vehicle 2 so as to slide to one side of the associated door opening as illustrated in FIG. 12, rather than to swing outwardly with respect to the door opening.

Door interlock system 300 comprises a target wand 302 (FIG. 13) attached via plate 304 to the end of lifting link 66 which is pivotally mounted to vertically extending arm 72 so as to rotate in tandem with lifting link 66 about the elongate axis of tube 76 to which the lifting link is attached. Preferably, wand 302 is made from metal, e.g. high carbon steel.

Door interlock system 330 additionally comprises a floor level sensor 310 and a floor proximate sensor 312. Sensors 310 and 312 are conventional proximity sensors. The size and placement of wand 302 and the placement of sensors 310 and 312 are selected so that as fixed platform 56 moves upwardly from the ground or from the floor level of compartment 9 toward the floor level of vehicle floor 27, a point will be reached where wand 302 passes in front of floor proximate sensor 312. When wand 302 achieves such physical relation with sensor 312, the latter provides an output signal to control panel 14 indicating the wand is positioned in front of the floor proximate sensor. The size and placement of wand 302 and the placement of floor proximate sensor 312 are selected so that wand 302 will pass in front of sensor 312 when the fixed platform 56 is positioned about six inches below the floor 27 of vehicle 2.

As fixed platform 56 continues to move upwardly toward vehicle floor 27, a point will be reached when the top surface of fixed platform 56 is substantially coplanar with the floor 27 of vehicle 2. Wand 302 is sized and placed, and floor level sensor 310 is positioned, so that wand 302 will pass in front of sensor 310 just as the top surface of fixed platform 56 achieves coplanar alignment with the floor 27 of vehicle 2. When wand 302 is positioned in front of floor level sensor 310, the latter provides an output signal to control panel 14 indicating the top surface of fixed platform 56 is aligned with vehicle floor 27.

Door interlock system 300 additionally comprises a conventional, manually operable, latch mechanism 318 for locking door 13 in the closed position illustrated in FIG. 11, and for unlocking the door so as to permit it to be moved to the open position illustrated in FIG. 12. System 300 also includes a latch interlock 320 operatively associated with latch mechanism 318 and coupled with control panel 14 for preventing the latch mechanism from being moved from the locked to the unlocked position when the interlock receives an enable signal, and for permitting the mechanism 318 to be moved from the locked to the unlocked position when the interlock receives a disable signal. The specific design of interlock 320 is not critical to the present invention so long as it achieves the functions described above. However, in one embodiment of the invention, interlock 320 comprises a solenoid-driven pin (not shown) configured and positioned to coact with latch mechanism 318 so as to prevent the latter from being moved from the locked to the unlocked position when the solenoid receives an enable signal and for permitting the latch mechanism to be moved from the locked to the unlocked position when the solenoid receives a disable signal.

Control panel 14 is coupled with interlock 320 and is designed to provide enable and disable signals to the interlock so as to cause the latter to prevent or permit, respectively, the latch mechanism 318 to be moved from the locked to the unlocked positions. Assuming control panel 14 has been providing an enable signal to door interlock 320 and latch mechanism 318 is in the locked position and door 13 is in the closed position illustrated in FIG. 11, the control panel will provide a disable signal to the interlock at the instant floor proximate sensor 312 is blocked by wand 302, which blockage occurs as fixed platform 56 moves upwardly to a position about six inches below the level of vehicle floor 27. Upon receipt of the disable signal, interlock 320 will permit latch mechanism 318 to be moved from the locked to the unlocked position, thereby permitting the door 13 to be moved to the open position illustrated in FIG. 12. Additionally, after fixed platform 56 has been positioned in coplanar relation with vehicle floor 27 and is then caused to move downwardly a point will be reached where wand 302 again passes in front of floor proximate sensor 312, at which point the latter again provides an output signal to control panel 14 indicating wand 302 is positioned in front of sensor 312. On receipt of this second output signal from sensor 312, control panel 14 again provides an enable signal to interlock 320. As soon as door 13 is closed and latch mechanism 318 is moved to the locked position, interlock 320 will secure the latch mechanism in the locked position. When the present lift is used in accordance with preferred operating procedures, the operator of the lift will close door 13 and move latch mechanism 318 to the locked position shortly after a wheelchair user has positioned his or her wheelchair on platforms 56 and 58 and before the platforms have been caused to move downwardly more than a relatively small distance, e.g., 6-18 inches, with respect to the level of vehicle floor 27.

In its simplest form, door interlock system 300 comprises only a single proximity sensor: floor proximate sensor 312. However, to enhance the functionality of the present lift floor level sensor 310 is also provided. Control panel 14 may be designed to use the output signal generated by sensor 310 when wand 302 is positioned in front of the sensor for controlling other portions of the present lift, such as the raising and lowering of bridge barrier 112. Alternatively, control panel 14 may be designed to provide an enable signal to interlock 320 only after (1) platform 56 has been moved upwardly so as to cause floor proximate sensor 312 to generate a first output signal, (2) after an output signal has been received from floor level sensor 310, and (3) platform 56 has been moved downwardly so as to cause sensor 312 to generate a second output signal.

In an alternative embodiment of the present invention, latch mechanism 318 and interlock 320 are replaced with an automatic latching mechanism (not shown). The latter is designed to automatically lock door 13 in the closed position upon receipt of an enable signal and to automatically unlock door 13 so as to permit it to be moved to the unlocked position upon receipt of a disable signal.

Additionally, it is to be appreciated that the output signals of sensors 310 and 312 may be used to control the operation of other portions of the platform lift with which the present invention is used. For instance, the output of sensor 312 may be used to control the operation of the hydraulic actuators 82 and 84 which cause platform 56 to raise and lower.

Since certain changes may be made in the apparatus described above without departing from the scope of the present invention, it is intended that all matter contained in the above description or shown in the accompanying drawings shall be interpreted in an illustrative and not in a limiting sense.

The embodiments of the invention in which an exclusive property or privilege is claimed are defined as follows:

1. A stow latch device for securing a wheelchair lift in a stowed position, the lift comprising a platform assembly comprising a main platform and a bridge barrier pivotally mounted to one end of the main platform so as to be movable between an extended position and a retracted position, and support means to be secured to a compartment of the vehicle in which the lift is installed for supporting the platform assembly, wherein the platform assembly is movably mounted on the support means so as to be movable in a first direction away from the stowed position and in a second opposite direction toward the stowed position, the stow latch device comprising:

first means, couplable with the compartment of the vehicle, for providing a fixed barrier surface;

second means, movably attached to the platform assembly so as to be movable between first and second positions, for engaging said barrier surface when said second means is in said first position so as to prevent said platform assembly from moving from the stowed position in the first direction and for permitting said platform assembly to move from the stowed position in said first direction when said second means is in said second position; and third means, coupled with said second means and couplable with the bridge barrier, for transmitting motion from the bridge barrier to said second means so as to cause said second means (a) to move to said first position when the bridge barrier is caused to move to the extended position and (b) to move to said second position when the bridge barrier is caused to move to the retracted position.

2. A stow latch according to claim 1, wherein said second means comprises a plate which is pivotally mounted to the main platform so as to be pivotally movable between said first and second positions, said plate being sized and configured so as to engage said barrier surface when in said first position.

3. A stow latch according to claim 1 wherein said third means comprises a linkage member sized to extend between said second means and the bridge barrier of the platform assembly, said linkage member being connected to said second means and connectable to the bridge barrier so that (a) when the bridge barrier is caused to move to the extended position said linkage member will cause said second means to move to the first position and (b) when the bridge barrier is is caused to move to the retracted position said linkage member will cause said second means to move to the second position.

4. A stow latch mechanism for securing a wheelchair lift in a stowed position, the lift comprising a platform assembly comprising a main platform and a bridge barrier pivotally mounted to one end of the main platform so as to be movable between an extended position and a retracted position, and support means to be secured to a compartment of the vehicle in which the lift is installed for supporting the platform assembly, wherein the platform assembly is movably mounted on the support means so as to be movable in a first direction away from the stowed position and in a second opposite direction toward the stowed position, the stow latch device comprising:

a barrier plate attachable to the compartment of the vehicle so as to provide a fixed surface adjacent the platform assembly;

a stow latch attachable to the platform assembly so as to be pivotally movable between first and second positions, said stow latch being sized and configured to engage said barrier plate when in said first position so as to prevent said platform assembly from moving from the stowed position in the first direction; and a linkage member attachable between the stow latch and the bridge barrier of the platform assembly, said linkage member being sized and configured so as to cause said stow latch (a) to move to said first position when the bridge barrier is caused to move to the extended position and (b) to move to said second position when the bridge barrier is caused to move to the retracted position.

5. A wheelchair lift designed to be installed in a compartment of a vehicle, the lift comprising:

a platform assembly comprising a main platform and a bridge barrier pivotally mounted to one end of the main platform so as to be movable between an extended position and a retracted position;

support means to be secured to the compartment of a vehicle in which the lift is installed for supporting the platform assembly, wherein the platform assembly is movably mounted on the support means so as to be movable in a first direction away from the stowed position and in a second opposite direction toward the stowed position;

first actuation means coupled with said platform for causing said platform assembly to move in said first and second directions along said path;

second actuation means coupled with said bridge barrier for causing said bridge barrier to move between said extended and retracted positions;

first means, couplable with the compartment of the vehicle, for providing a fixed barrier surface;

second means, movably attached to the platform assembly so as to be movable between first and second positions, for engaging said barrier surface when said second means is in said first position so as to prevent said platform assembly from moving from the stowed position in the first direction and for permitting said platform assembly to move from the stowed position in said first direction when said second means is in said second position; and third means, coupled with said second means and said bridge barrier, for transmitting motion from said bridge barrier to said second means so as to cause said second means (a) to move to said first position when said bridge barrier is caused to move to the extended position (b) to move to said second position when said bridge barrier is caused to move to the retracted position.

6. A door interlock system for use with a platform lift designed to be stowed in a lower compartment of a vehicle, the vehicle including a floor, the lift including a platform which is movable between an upper position, where the platform is substantially coplanar with the floor of the vehicle, and a lower position, the vehicle including a sliding door positioned above the lower compartment, the door being slidable between open and closed positions, the door interlock system comprising;

controller means for controlling locking and unlocking of the door, the controller means providing a first signal when the door is to be locked and a second signal when the door is to be unlocked;

lock means, coupled with the controller means and couplable with the door of the vehicle, for locking the door in the closed position upon receipt of the first signal, and for unlocking the door upon receipt of the second signal so as to permit the door to be moved to the open position; and first sensor means for providing a third signal when the platform has been moved from the lower position to a proximate position which is spaced a predetermined distance from the floor of the vehicle;

wherein the controller means is coupled with said first sensor means and provides said second signal to said lock means upon receipt of said third signal.

7. A system according to claim 6, wherein said sensor means comprises:

a target wand attached to said platform lift so as to move along a path as said platform is caused to move between said upper and lower positions;

a proximity sensor positioned adjacent said path for detecting the presence of said target wand and for providing said third signal upon detection of said target wand; and wherein said target wand is sized and is attached to said platform lift so that said target wand is detected by said proximity sensor when said platform is in said proximate position.

8. A system according to claim 6, further comprising second sensor means for providing a fourth signal when the platform has been moved into said upper position, said second sensor means being coupled with said controller means, wherein said controller means is designed to provide said first signal to said lock means after first receiving said fourth signal and then receiving said third signal.

9. A system according to claim 6, wherein said lock means comprising:

a. a latch mechanism, couplable with the door of the vehicle and movable between locked and unlocked positions, for preventing the door from being moved from a closed to a open position when the latch mechanism is in the locked position, and for permitting the door to be moved from the closed to the open position when the latch mechanism is in the unlocked position; and b. an interlock coupled with said latch mechanism for preventing the latch mechanism from being moved from the locked to the unlocked position upon receipt of an enable signal and for permitting the latch mechanism to be moved from the locked to the unlocked position upon receipt of a disable signal.

10. A platform lift designed to be stowed in a compartment beneath the floor of a vehicle, the vehicle including a sliding door positioned above the compartment which is movable between open and closed positions, the lift comprising:

controller means for controlling locking and unlocking of the door, the controller means providing a first signal when the door is to be locked and a second signal when the door is to be unlocked;

a platfrom which is movable between extended and retracted positions, and which is movable between upper and lower positions when in the extended position, said platform being substantially coplanar with the floor of the vehicle when in the upper position;

actuation means, coupled with said platform, for moving said platform between said extended and retracted positions and between said upper and lower positions;

lock means, coupled with the controller means and couplable with the vehicle adjacent the door, for locking the door of the vehicle in the closed position upon receipt of the first signal and for unlocking the door receipt of the second signal; and sensor means, coupled with the platform, for providing a third signal when said platform is moved from said lower position to a proximate position spaced a predetermined distance from the floor of the vehicle;

wherein the controller means is coupled with said sensor means and provides said second signal to said lock means upon receipt of said third signal from said sensor means.

* * * * *

UNITED STATES PATENT AND TRADEMARK OFFICE
CERTIFICATE OF CORRECTION

PATENT NO. : 5,158,419
DATED : October 27, 1992
INVENTOR(S) : D. Kempf et al.

It is certified that error appears in the above-identified patent and that said Letters Patent is hereby corrected as shown below:

| COLUMN | LINE | |
|---|---|---|
| 1 | 48 | "Pat." should read --patent application Ser.-- |
| 12 | 10 | "comprising" should read --comprises-- |
| 12 | 14 | "a open" should read --an open-- |

Signed and Sealed this

Seventh Day of December, 1993

Attest:

BRUCE LEHMAN

*Attesting Officer*

*Commissioner of Patents and Trademarks*